(12) United States Patent
Rhee et al.

(10) Patent No.: US 12,163,844 B2
(45) Date of Patent: Dec. 10, 2024

(54) BOLOMETER READOUT INTEGRATED CIRCUIT (ROIC) WITH ENERGY DETECTION

(71) Applicant: RAYTHEON COMPANY, Waltham, MA (US)

(72) Inventors: Jehyuk Rhee, Newbury Park, CA (US); Matthew C. Thomas, Carpinteria, CA (US); Henry Lee, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 587 days.

(21) Appl. No.: 17/523,391

(22) Filed: Nov. 10, 2021

(65) Prior Publication Data

US 2024/0288311 A1 Aug. 29, 2024

(51) Int. Cl.
*G01J 5/24* (2006.01)
*G01J 5/00* (2022.01)
*G01J 5/04* (2006.01)

(52) U.S. Cl.
CPC ............... *G01J 5/24* (2013.01); *G01J 5/048* (2013.01); *G01J 2005/0077* (2013.01)

(58) Field of Classification Search
CPC ....... G01J 5/24; G01J 5/048; G01J 2005/0077
See application file for complete search history.

(56) References Cited

U.S. PATENT DOCUMENTS

| 5,420,419 A | 5/1995 | Wood |
| 10,868,979 B1 * | 12/2020 | Boesch .................. G01J 5/22 |
| 2020/0393304 A1 | 12/2020 | Thomas et al. |

OTHER PUBLICATIONS

International Search Report and Written Opinion issued in International Application No. PCT/US2022/033922; Application Filing Date Jun. 17, 2022; Date of Mailing Oct. 28, 2022 (14 pages).
Perenzoni et al., "A 160× 120-pixel uncooled IR-FPA readout integrated circuit with on-chip non-uniformity compensation" 2010 Proceedings of ESSCIRC. IEEE, Sep. 2010, Abstract Only (3 pages).

* cited by examiner

*Primary Examiner* — David P Porta
*Assistant Examiner* — Meenakshi S Sahu
(74) *Attorney, Agent, or Firm* — CANTOR COLBURN LLP

(57) ABSTRACT

A LADOR circuit is in signal communication with a pixel array. The LADOR circuit is configured to generate an integrator reset voltage based on a resistance of the at least one heated bolometer pixel, and to detect laser energy incident on the at least one heated bolometer pixel based on a comparison between the integrator reset voltage and an input threshold voltage (Vthreshold).

19 Claims, 5 Drawing Sheets

BOLOMETER READOUT INTEGRATED CIRCUIT (ROIC) WITH ENERGY DETECTION

GOVERNMENT LICENSE RIGHTS

This invention was made with Government support under W15P7T-19-D-0082 awarded by the Department of Defense (DoD). The Government has certain rights in this invention.

BACKGROUND

The present teachings are generally related to thermal imaging systems, and more particularly, to a readout integrated circuit included in a thermal imaging system.

Bolometer pixels are used in a wide variety of infrared or thermal imaging applications. When they are exposed to heat sources, bolometer pixels change their resistance to provide an output signal. A readout integrated circuit (ROIC) is typically utilized to detect and measure the output signal from one or more of bolometer pixels included in a pixel array. However, bolometer pixels are vulnerable to excessive heat sources which can fundamentally change the mechanical properties and response of the pixels and degrade their resulting imaging capability. In addition, extreme heat sources can completely destroy the pixels.

SUMMARY

According to another non-limiting embodiment, a laser detection (LADOR) circuit comprises an integrator circuit and a laser detection circuit. The integrator circuit is in signal communication with a pixel array. The integrator circuit is configured to generate an integrator reset voltage based on a resistance of at least one bolometer pixel that is read out from the pixel array. The laser detection circuit is in signal communication with the integrator circuit. The laser detection circuit is configured to detect laser energy incident on the at least one bolometer pixel based on a comparison between the integrator reset voltage and an input threshold voltage Vthreshold.

According to yet another non-limiting embodiment, a method of detecting laser energy incident on a pixel array. The method comprises generating an integrator reset voltage based on a resistance of at least one bolometer pixel that is read out from the pixel array; and comparing the integrator reset voltage to an input threshold voltage Vthreshold. The method further comprises detecting laser energy incident on the at least one bolometer pixel based the comparison between the integrator reset voltage and the input threshold voltage Vthreshold.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
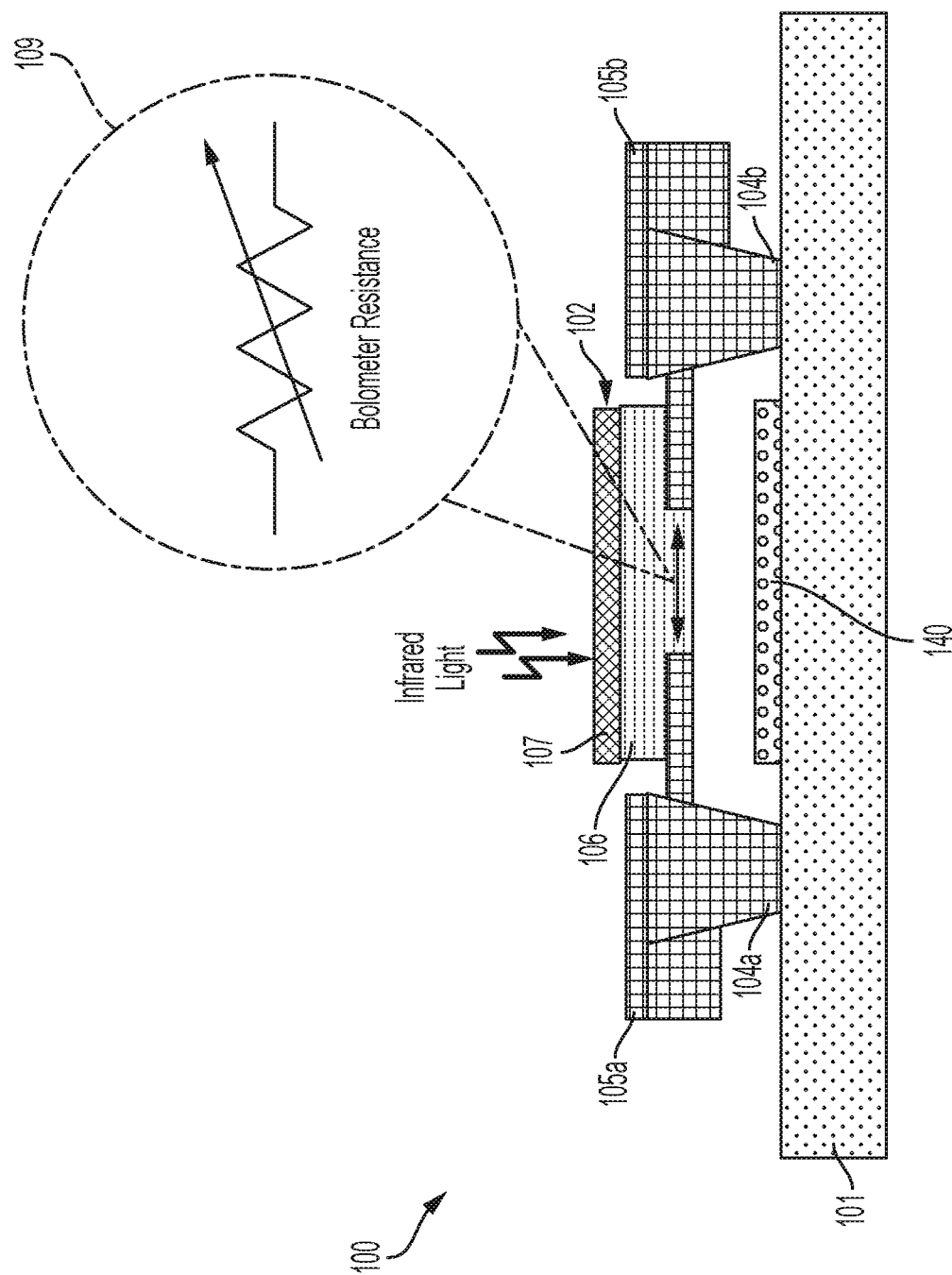
FIG. 1 is a block diagram view of a bolometer pixel according to a non-limiting embodiment.

Various non-limiting embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections or positional relationships, unless otherwise specified, can be direct or indirect, and the present invention is not intended to be limited in this respect. Moreover, the various tasks and process operations described herein can be incorporated into a more comprehensive procedure or process having additional steps or functionality not described in detail herein, or one or more tasks or operations may be optional without departing from the scope of the invention.

The following definitions and abbreviations are to be used for the interpretation of the claims and the specification. As used herein, the terms "comprises," "comprising," "includes," "including," "has," "having," "contains," or "containing," or another variation thereof, are intended to cover a non-exclusive inclusion. For example, a composition, mixture, process, method, article, or apparatus that comprises a list of elements is not necessarily limited to only those elements but can include other elements not expressly listed or inherent to such composition, mixture, process, method, article, or apparatus.

Additionally, the terms "at least one" and "one or more" may be understood to include a number greater than or equal to one (e.g., one, two, three, four, etc.). The term "a plurality" may be understood to include a number greater than or equal to two (e.g., two, three, four, five, etc.). The terms "about," "substantially," or "approximately," or variations thereof, are intended to include a degree of error associated with measurement of the particular quantity based upon the equipment available.

For the sake of brevity, conventional techniques related to making and using aspects of the invention may or may not be described in detail herein. In particular, various aspects of computing systems to implement the various technical features described herein may be well known. Accordingly, in the interest of brevity, some conventional implementation details are only mentioned briefly herein or are omitted entirely without providing the well-known system or process details.

Turning now to an overview of technologies that are more specifically relevant to aspects of the invention, bolometer readout integrated circuits (ROICs) are typically implemented in thermal imaging system to measure the resistivity of one or more bolometer pixels included in a pixel array. However, bolometer pixels are vulnerable to excessive heat sources which can fundamentally change the mechanical properties and response of the pixels and degrade their resulting imaging capability. In addition, extreme heat sources can completely destroy the pixels.

A solution for addressing the shortcomings described above is to provide a trigger sense circuit to the bolometer ROIC that weakly biases pixels when they are not being integrated and monitors the total parallel resistance to detect excessive incident energy. The energy can include, but is not limited to, laser energy, i.e., laser heating associated with the laser radiation, radiation energy, and solar energy. However, heat resulting from weakly biasing the pixel reduces sensitivity and increases noise. Also considerable power is required for weakly biasing the whole pixel array.

One or more non-limiting embodiments of the invention address the above-described shortcomings of the prior art by providing a bolometer ROIC with laser detection (referred to herein as a "LADOR" circuit). The LADOR circuit includes an integrator and a comparator. During operation, energy incident on a given bolometer pixel included in the pixel array rapidly reduces the bolometer pixel's resistance, which in turn pulls down (i.e., reduces) an integrator reset voltage of the integrator. Although the energy is described herein as laser energy, it should be appreciated that other forms of energy can be detected by the LADOR circuit including, but not limited to, radiation energy and solar energy. Accordingly, following a reset of the integrator, laser energy incident on a given bolometer pixel can be detected by comparing the integrator reset voltage input to the comparator with an input threshold voltage (Vthreshold) of the comparator. When the integrator reset voltage falls below Vthreshold, the comparator outputs a flag (e.g., a logic "1" value) indicating presence of excessive or damaging laser energy incident on a given bolometer pixel.

With reference now to FIG. 1, a bolometer pixel 100 is illustrated according to a non-limiting embodiment. The bolometer pixel 100 includes a substrate 101 that supports a bolometer 102 via a pair of opposing support beams 104a and 104b. The support beams 104a, 104b each include an electrode 105a and 105b. The bolometer 102 includes a photosensitive region 106 (sometimes referred to as a mesa), which is interposed between the electrodes 105a, 105b, and thermally isolated from the substrate 101 by the support beams 104a, 104b.

The photosensitive resistive region 106 is formed from a thermoelectric conversion material (e.g. amorphous silicon) having a thermal resistance coefficient value. In some embodiments, an absorber layer 107 is formed on an upper surface of the photosensitive resistive region 106 and is configured to selectively pass wavelengths of light (e.g., infrared light). The thermal resistance coefficient value provides a bolometer thermal resistance 109, which can be utilized to sense thermal energy delivered to the bolometer pixel 100. For example, when thermal energy (e.g., infrared light) is delivered to the photosensitive resistive region 106, the resistance of the thermoelectric conversion material decreases. When the ROIC 140 applies a current, the change in bolometer electrical resistance is converted into a voltage, which can be read out via a ROIC 140 such that the bolometer 102 can be utilized as a thermal sensor.

Figure 2:
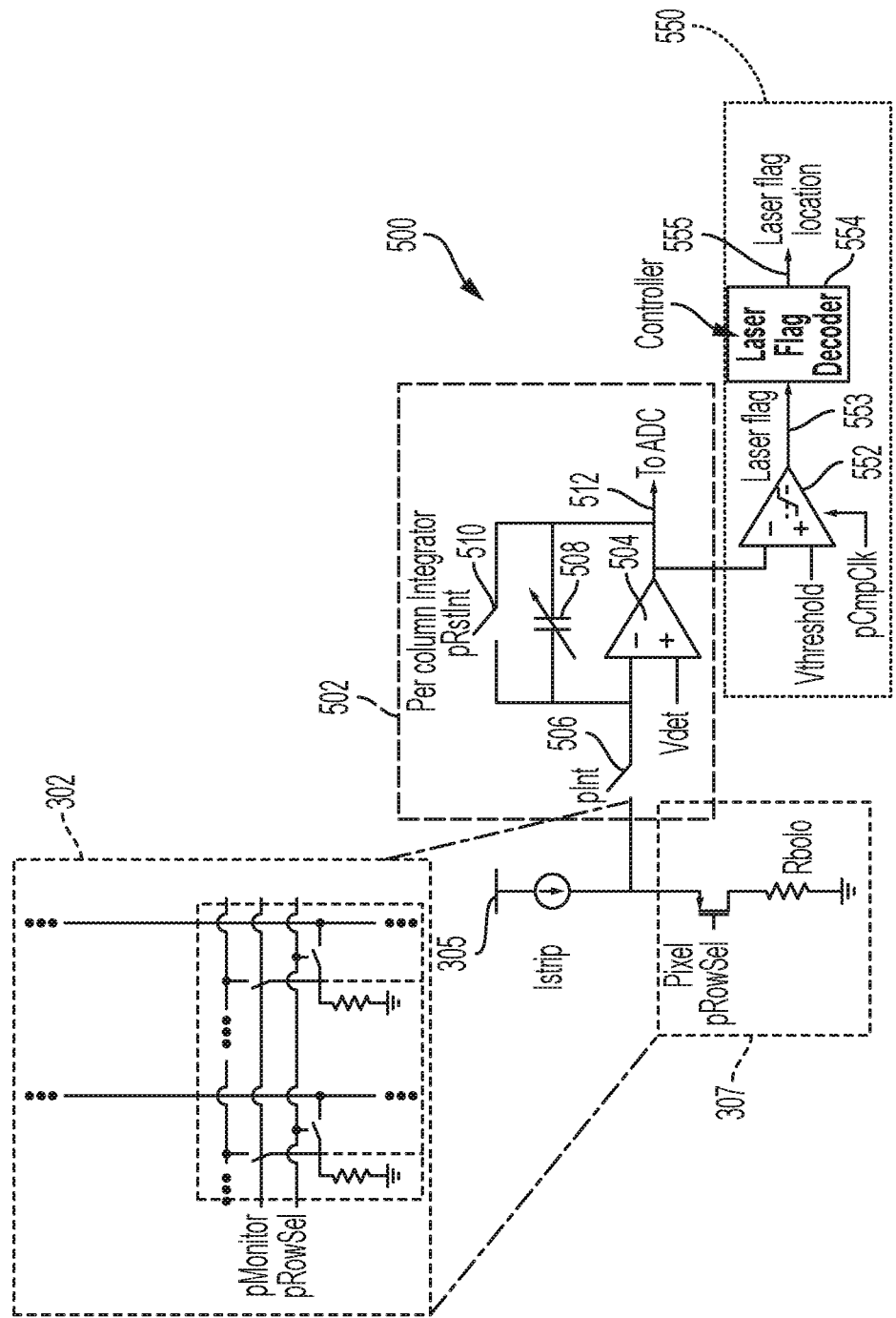
FIG. 2 is a schematic diagram of a laser detection (LADOR) circuit according to a non-limiting embodiment.

Referring to FIG. 2, a LADOR circuit 500 is illustrated according to a non-limiting embodiment. The LADOR circuit 500 is configured to detect energy incident on a pixel array 302. As mentioned herein, one example of the detected energy is laser energy, but it should be appreciated that other forms of energy can be detected including, but not limited to, radiation energy and solar energy. The LADOR circuit 500 includes a current integrator 502 and a laser detection circuit 550. The current integrator 502 includes an amplifier 504, an integrator input switch 506, an integrator capacitor 508, and an integrator reset switch 510. The amplifier 504 includes an amplifier positive input (+) and an amplifier negative input (−). The amplifier positive input (+) is configured to receive a detection voltage (Vdet). The amplifier negative input (−) is connected to a first end of the integrator input switch 506. The second end of the input switch 506 is connected to a row readout output of a selected pixel 307 included in the pixel array 302. The integrator capacitor 508 includes a first terminal connected to the amplifier negative input (−) of the amplifier 504 and a second terminal connected to an output 512 of the amplifier 504. The integrator reset switch 510 is connected in parallel with the integrator capacitor 508. For instance, the integrator reset switch 510 includes a first switch terminal that is connected in common with the first terminal of the integrator capacitor 508 and the amplifier negative input (−) of the amplifier 504, and a second switch terminal that is connected in common with the second terminal of the integrator capacitor 508 and the output 512 of the amplifier 504.

The laser detection circuit 550 includes a comparator 552, and a laser flag decoder 554. The comparator 552 includes a clock input, a comparator positive input (+), and a comparator negative input (−). The clock input is configured to receive a clock signal (pCmpClk) such as, for example, a clocked pulse signal. The comparator positive input (+) is configured to receive a comparator threshold voltage (Vthreshold). The comparator negative input (−) is connected to the output 512 of the amplifier 504. The output 553 of the comparator 552 is indicative as to whether laser energy is incident on a given selected bolometer pixel 307.

The laser flag decoder 554 includes an input that is connected to the output 553 of the comparator 552. In one or more non-limiting embodiments, the laser flag decoder 554 can include, for example, a controller. Accordingly, the laser flag decoder 554 can output 555 a signal indicative of the row and column address associated with the pixel realizing incident laser energy.

In one or more non-limiting embodiments, the output signal 555 of the laser flag decoder 554 is delivered to an imaging controller (not shown). Accordingly, the imaging controller can receive the row and column address indicated by the output signal 555, and determine the specific location (e.g., the specific row and column) or one or more pixels in the pixel array that are experiencing excessive heat from incident energy, e.g., laser energy, radiation energy and/or solar energy. In one or more non-limiting embodiments, the imaging controller can output a protection control signal in response to detecting one or more pixels experiencing excessing incident energy. The protection control signal can invoke a thermal protection operation and/or can initiate a thermal mitigation device such as, for example, a shutter or voltage-controlled window, that blocks the thermal energy source from delivering damaging radiation to the overheated pixels located at one or more determined rows and one or more determined columns indicated by the output signal 555.

The current integrator 502 operates as a bolometer pixel readout circuit, and utilizes the amplifier 504 and integrator capacitor 508 to measure resistance of a selected bolometer pixel (e.g., pixel 307) on a per column basis. During readout operation, a detection voltage (Vdet) is applied to the selected pixel row. Current through the selected pixel row, which is inversely proportional to resistance of a selected bolometer pixel, is integrated to integrator capacitor 508. The detection voltage can be set to 3 volts (V), for example but it should be appreciated that other voltages and can be used without departing from the scope of the invention.

A reset mode of the current integrator 502 is invoked by closing the row select switch (pRowSel) associated with the bolometer pixel 307, along with both the integrator input switch (pInt) 506 and the integrator reset switch (pRstInt) 510. Accordingly, the detection voltage Vdet is applied to the bolometer pixel through the feedback signal path established via the integrator reset switch (pRstInt) 510 from the integrator output 512 to the amplifier input (−).

In a normal condition (e.g., when no laser energy is incident on a pixel 307 associated with a given selected column and selected row), the integrator reset voltage is set by the detection voltage (Vdet) via unity gain feedback of the amplifier 504 due to the input resistance of the amplifier 504 on the unity gain feedback during reset being much lower than the bolometer resistance. During a laser condition (e.g., when laser energy is incident on the pixel 307 associated with a given selected column and selected row), however, the bolometer resistance (Rbolo) rapidly decreases as the bolometer temperature (Tbolo) increases. Accordingly, the bolometer resistance (Rbolo) becomes less than the input resistance of the amplifier 504 and the pull down integrator reset voltage decreases.

Figure 3A:
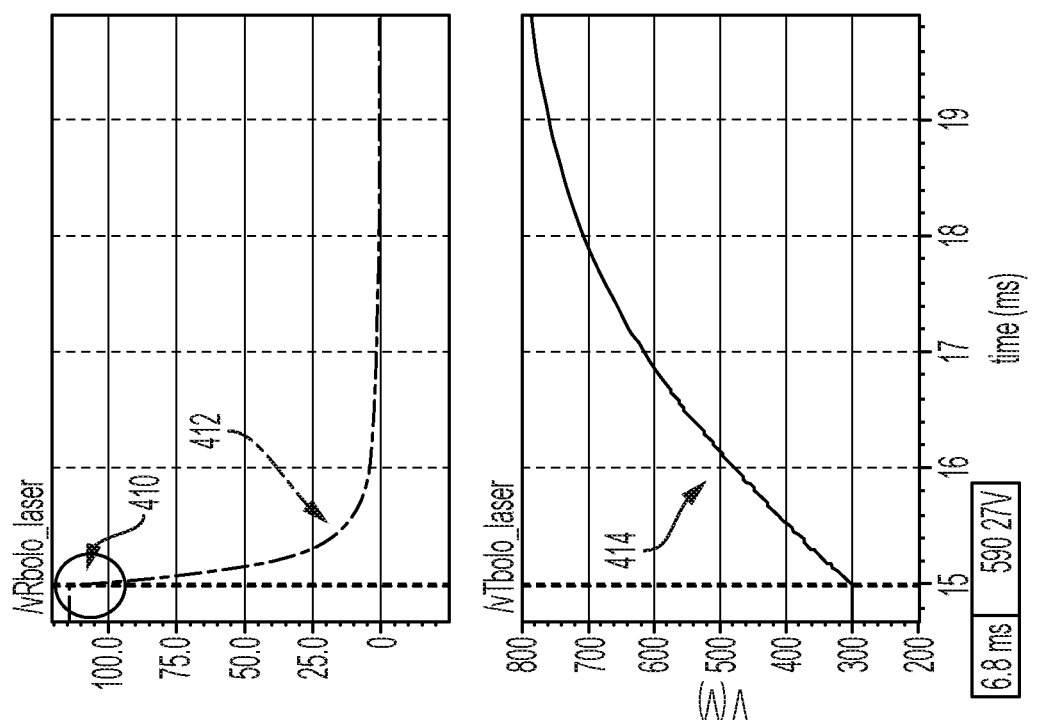
FIG. 3A is a diagram illustrating the relationship between a resistance (Rbolo) of a bolometer pixel and an increasing temperature (Tbolo) of the bolometer pixel over time caused by a laser incident on the bolometer pixel according to a non-limiting embodiment.
Figure 3B:
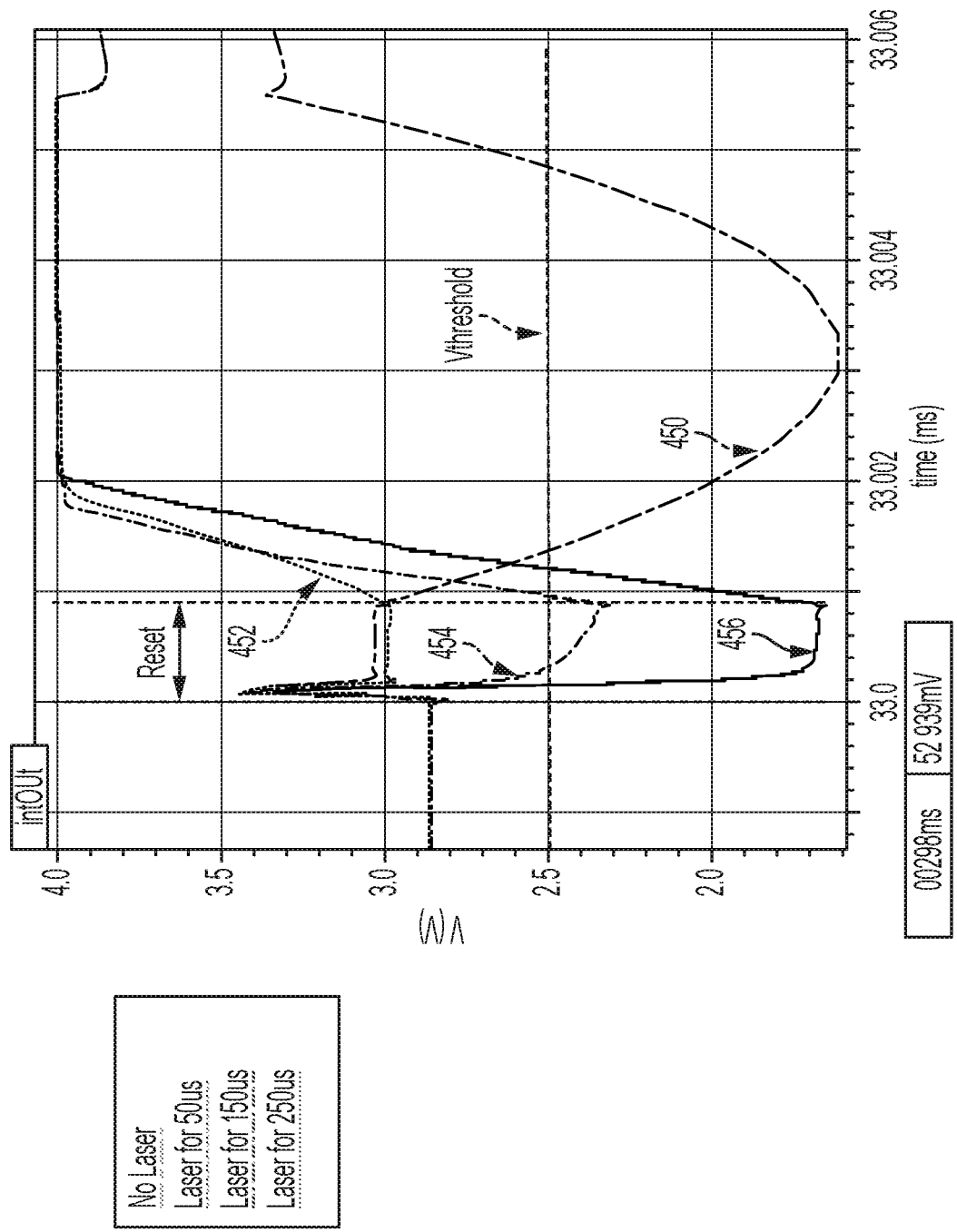
FIG. 3B is a diagram illustrating different integrator output signals of the LADOR circuit shown in FIG. 2 when a bolometer pixel experiences different laser exposure times according to a non-limiting embodiment.

FIGS. 3A and 3B illustrate the relationship between the bolometer temperature the bolometer resistance described herein. For example, the relationship between the bolometer resistance (Rbolo) and an increasing bolometer temperature (Tbolo) over time caused by a laser incident on a bolometer pixel associated with a given selected column and selected row. In FIG. 3A, for example, a laser event 410 occurs at time t=15 milliseconds (ms). Accordingly, the bolometer resistance (Rbolo) 412 rapidly decreases as the bolometer temperature (Tbolo) 414 increases.

FIG. 3B illustrates different integrator output signals of the LADOR circuit shown in FIG. 2 when a bolometer pixel experiences different laser exposure times according to a non-limiting embodiment. Line 450 represents the integrator output 512 when a given bolometer pixel 307 is not experiencing laser energy incident thereon. As laser exposure time on the bolometer pixel increases, the bolometer resistance decreases. For example, line 452 represents the integrator output 512 when a given bolometer pixel 307 is experiencing laser energy incident for a laser exposure time of about 50 microseconds, line 454 represents the integrator output 512 when a given bolometer pixel 307 is experiencing laser energy incident for a laser exposure time of about 150 microseconds, and line 456 represents the integrator output 512 when a given bolometer pixel 307 is experiencing laser energy incident for a laser exposure time of about 250 microseconds. As shown in FIG. 3B, a laser exposure time that exceeds about 150 microseconds (us) causes the reset level to fall below the threshold voltage (Vthreshold) (e.g., about 2.5 V) of the comparator 552 after transitioning the LADOR circuit 500 from the reset mode to the laser detection mode. Thus, the LADOR circuit 500 is capable of detecting laser incident on the bolometer by comparing the integrator reset voltage with the threshold voltage at the end of reset period (i.e., switching the LADOR circuit 500 from the reset mode to the laser detection mode).

Returning to FIG. 2, the comparator 552 is utilized with the current integrator 502 to detect laser energy incident on a given pixel 307 of the pixel array 302 and identify the particular row of pixel array 302 containing the pixel experiencing the incident laser energy on a per column basis. According to one or more non-limiting embodiments, the outputs of the comparator 552 from all the columns are delivered to the laser flag decoder 554. In turn, the laser flag decoder 554 generates an output 555, which indicate the row and column address of the pixel 307 experiencing incident laser energy.

Figure 4:
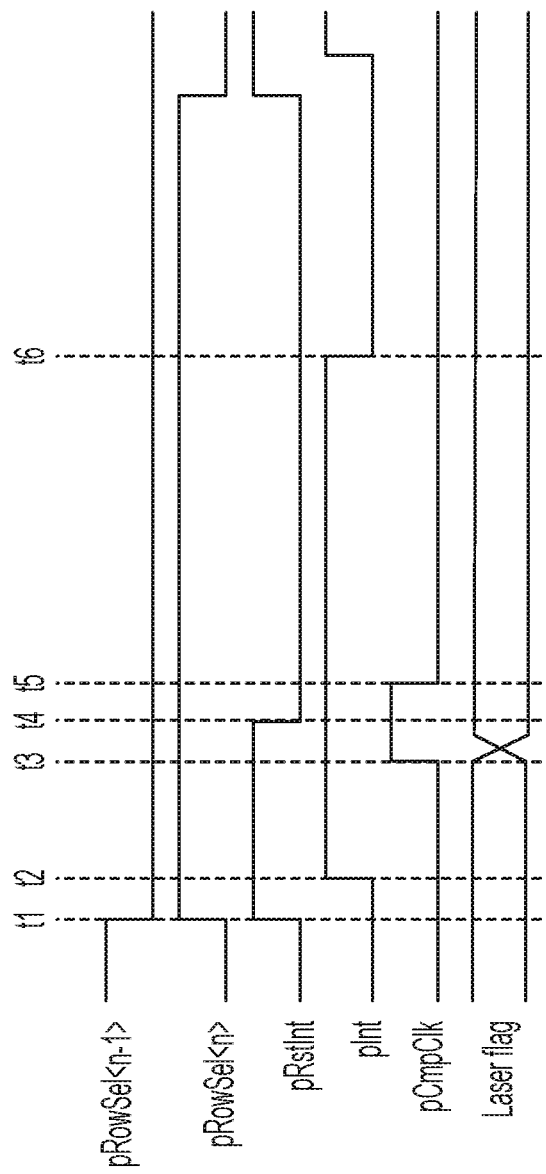
FIG. 4 depict various signal diagrams associated with the LADOR circuit show in FIG. 2 according to a non-limiting embodiment.

FIG. 4 depicts signal diagrams associated with the LADOR circuit 500 according to a non-limiting embodiment. At time (t1) the row selector switch (pRowSel<n>) becomes high and n-th row is selected for readout. At the same time, integrator reset switch (pRstint) 510 is switched on (reset mode), which establishes unity gain feedback between integrator input and integrator output. Accordingly, the detection voltage (Vdet) is applied to the negative input of the amplifier 504. At time (t2) integrator input switch (pInt) becomes high and the selected pixel is connected to the integrator in reset mode.

In a normal condition (e.g., when no laser energy is incident on bolometer pixel 307) the bolometer resistance is much larger than input resistance of integrator in reset mode (unity gain configuration) and the reset voltage does not move from Vdet. During a laser condition (e.g., when laser energy is incident on the pixel 307), however, the bolometer resistance (Rbolo) becomes less than the input resistance of the integrator in reset mode and reset voltage is pulled down from Vdet. At time (t3) the clock (pCmpClk) input to the clocked comparator 552 rises and the comparator 552 outputs laser flag to laser flag decoder 554, where row and column address of the laser incidents are decoded. At time (t4) pRstInt becomes low and integrator reset switch (pRstint) 510 is switched off (integration mode), which makes current integrator 502 integrate current differential between current (Istrip) provided by the constant bias current source 305 and the current flowing through the bolometer pixel (e.g., pixel 307). At time (t5) the comparator clock signal (pCmpClk) becomes low and the output of the comparator 552 is stored until the next rising of the comparator clock signal (pCmpClk). At time (t6) pInt becomes low and the selected bolometer pixel is disconnected from the current integrator 502 and current integration stops.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A laser detection (LADOR) circuit included in a bolometer readout circuit, the LADOR circuit comprising:

an current integrator in signal communication with a pixel array, the current integrator configured to generate an integrator reset voltage based on a resistance of at least one bolometer pixel that is read out from the pixel array; and a laser detection circuit in signal communication with the integrator circuit, the laser detection circuit configured to detect energy incident on the at least one bolometer pixel based on a comparison between the integrator reset voltage and an input threshold voltage (Vthreshold).

2. The LADOR circuit of claim 1, wherein the energy comprises one or more of laser energy, solar energy and thermal radiation that reduces the resistance of the at least one bolometer pixel.

3. The LADOR circuit of claim 2, wherein the integrator reset voltage decreases in response to reducing the resistance of the at least one bolometer pixel.

4. The LADOR circuit of claim 3, wherein the laser detection circuit comprises:

a comparator including a first input configured to receive the integrator reset voltage, and a second input configured to receive the Vthreshold; and a laser flag decoder including an input connected to an output of the comparator to receive a flag signal, wherein the laser flag decoder determines a location of the at least one heated bolometer pixel experiencing the incident energy based on the flag signal.

5. The LADOR circuit of claim 4, wherein the flag signal indicates that the energy incident on the at least one bolometer pixel has an excessive temperature that exceeds a temperature threshold in response to the integrator reset voltage falling below the Vthreshold.

6. The LADOR circuit of claim 5, wherein the current integrator comprises:

an amplifier including a first input selectively connected to the pixel array, and a second input connected to a detection voltage (Vdet);

an integrator capacitor including a first terminal connected to the first input and a second terminal connected to an output of the integrator; and an integrator reset switch including a first switch terminal connected in common with the first terminal and the first input, and a second switch terminal connected in common with the second terminal and the output of the comparator.

7. The LADOR circuit of claim 6, wherein the integrator reset voltage of the integrator is reduced in response to the incident laser energy reducing the resistance of the at least one bolometer pixel.

8. The LADOR circuit of claim 5, wherein the flag signal is output to an imaging controller, and wherein the imaging controller is configured to determine the location of the at least one heated bolometer pixel experiencing the incident energy based on the flag signal.

9. The LADOR circuit of claim 8, wherein the imaging controller is configured to invoke one or both of a thermal protection operation and a thermal mitigation device in response to determining the location of the at least one heated bolometer pixel experiencing the incident energy.

10. The LADOR circuit of claim 9, wherein the location of the at least one heated bolometer pixel experiencing the incident energy includes at least one row and at least one column in the pixel array containing the at least one heated bolometer pixel.

11. The LADOR circuit of claim 10, wherein the thermal protection operation includes controlling a shutter or voltage-controlled window to blocks the thermal energy source from delivering the energy to the at least one heated bolometer pixel located at the at least one row and the at least one column.

12. A method of detecting laser energy incident on at least one bolometer pixel included in a pixel array, the method comprising:

generating, via a current integrator in signal communication with the pixel array, an integrator reset voltage based on a resistance of at least one bolometer pixel that is read out from the pixel array; and comparing, via a laser detection circuit in signal communication with the current integrator, the integrator reset voltage to an input threshold voltage Vthreshold; and detecting, via the laser detection circuit, laser energy incident on the at least one bolometer pixel based the comparison between the integrator reset voltage and the input threshold voltage Vthreshold.

13. The method of claim 12, wherein generating the integrator reset voltage is determined in response to detecting the resistance based on the laser energy.

14. The method of claim 13, wherein the integrator reset voltage decreases in response to a reduction of the resistance.

15. The method of claim 14, wherein detecting the laser energy further comprises:

delivering the integrator reset voltage to a first input of a comparator;

delivering the Vthreshold to a second input of the comparator;

outputting, via the comparator, a flag signal indicating the laser energy incident on the at least one bolometer pixel has an excessive temperature that exceeds a temperature threshold in response to the integrator reset voltage falling below the Vthreshold;

delivering the flag signal to a laser flag decoder and determining, via the laser flag decoder, a location of the at least one bolometer pixel experiencing the laser energy having the excessive temperature based on the flag signal.

16. The method of claim 15, further comprising outputting the flag signal to an imaging controller; and determining, via the imaging controller, the location of the at least one heated bolometer pixel experiencing the incident laser energy based on the flag signal.

17. The method of claim 16, further comprising invoking, via the controller, one or both of a thermal protection operation and a thermal mitigation device in response to determining the location of the at least one heated bolometer pixel experiencing the incident laser energy.

18. The method of claim 17, wherein the location of the at least one heated bolometer pixel experiencing the incident laser energy includes at least one row and at least one column in the pixel array containing the at least one heated bolometer pixel.

19. The method of claim 18, wherein the thermal protection operation includes controlling a shutter or voltage-controlled window to blocks the thermal energy source from delivering the laser energy to the at least one heated bolometer pixel located at the at least one row and the at least one column.

* * * * *